United States Patent [19]
Wyness et al.

[11] 3,720,971
[45] March 20, 1973

[54] SHOE MAKING

[75] Inventors: Keith Gordon Wyness; Alan Roy Dodd, both of Norfolk; John Nigel Dixon Spinks, London; Kevin David Nicholas Kearney, Woking, all of England

[73] Assignee: The Shoe and Allied Trades Research Associated, Kettering, Northamptonshire, England

[22] Filed: Nov. 18, 1970

[21] Appl. No.: 90,770

[30] Foreign Application Priority Data

Nov. 20, 1969 Great Britain.....................56,929/69

[52] U.S. Cl. ................................................12/146 C
[51] Int. Cl. ..........................................................A43d
[58] Field of Search .........................12/146 R, 146 C

[56] References Cited

UNITED STATES PATENTS

| | | | |
|---|---|---|---|
| 3,445,873 | 5/1969 | Staden | 12/146 C |
| 2,540,850 | 2/1951 | Walsh | 12/146 C |
| 2,666,935 | 1/1954 | Gilbert et al. | 12/146 C |
| 3,309,725 | 3/1967 | Staden | 12/146 C |

*Primary Examiner*—Patrick D. Lawson
*Attorney*—Lerner, David & Littenberg

[57] ABSTRACT

Methods and apparatus for making shaped upper components for a shoe, Whole upper components or upper part upper components can be made. Vacuum and pressure forming techniques for conforming initially flat material to a moulding surface are disclosed. The moulding surfaces may be of a shape whereby the preformed upper is convertible to the shape of the last merely by a bending operation. The mould shape can be arrived at by forming a sheet of resiliently bendable material such as unplasticized PVC to the last shape required to form a shell and, after removing the shell from the last, partially flattening it by spreading outwardly the opposite sides. Where a male mould is used the surface of the material which is to be the outside surface of the shoe can be in contact with the mould surface, and the preformed upper would be turned inside out after removal from the mold; where a female mould is used the surface of the material which is to be inside the shoe may be in contact with the moulding surface and again the preformed upper would be turned inside out after removal from the mould. The moulding surface may be embossed to transfer a pattern to the upper material. The material is held during the moulding operation. A device for partially cutting out the upper from the sheet of material from which it is formed may be provided, which device may also operate as a clamp for holding the material during the forming operation.

18 Claims, 19 Drawing Figures

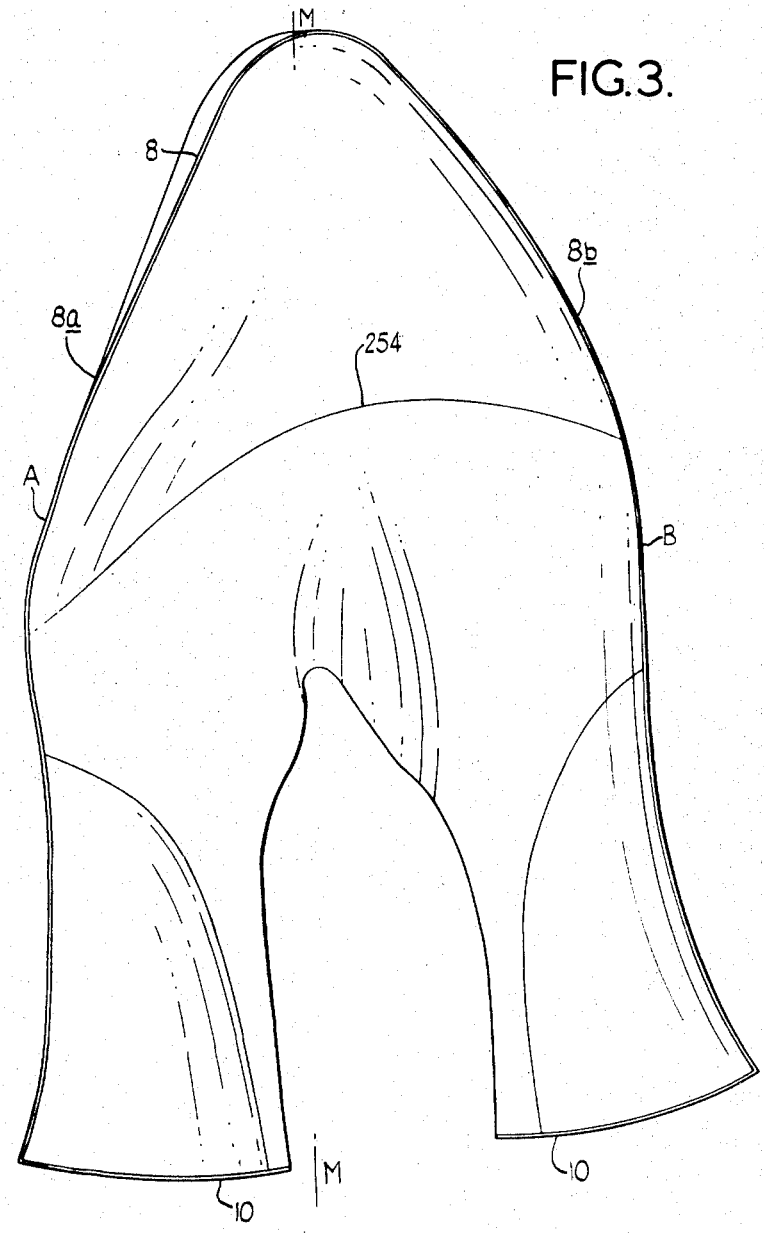

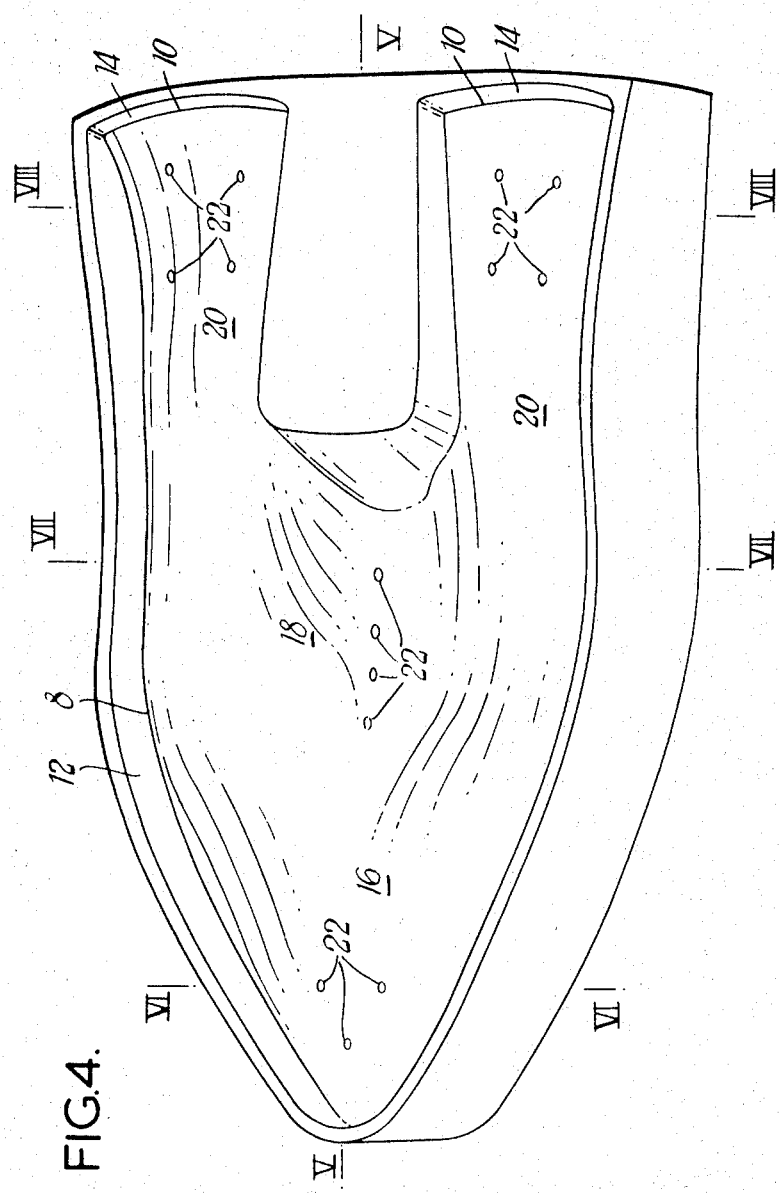

SHOE MAKING

This invention relates to shoe making and is concerned particularly with the production of shaped shoe uppers and shoe upper components. The invention provides novel methods and apparatus for producing such articles. The term shoe is used herein broadly and is intended to cover any article of footwear.

In shoe making, it is necessary to deform the material from which the upper of the shoe is made from its initial flat condition so that is assumes the required shape. Conventionally, this deformation has been carried out on a last and requires high operator skill and/or complicated machinery to stretch and compress the material to its required shape.

We have proposed methods and techniques for simplifying the formation of uppers by preshaping the upper forepart component so that the stretching and compression is carried out separately from the operation of bending or wrapping the material into a last shape.

Our British Patents Nos. 1096001 and 1096002 describe methods for determining the amount of stretch required in the material and for putting this stretch into the material by a mechanical gripping and pulling operation before conforming the material to the last.

Our British Patent Specification Nos. 1102695 and 1102696 describe method and apparatus for carrying out the preshaping operation on upper foreparts using male moulds. The shape of the moulds is that which would be arrived at by forming a sheet of resiliently bendable material, such as unplasticized polyvinyl chloride, to the last shape required and partially flattening out the shell by outwardly displacing the side portions.

U.S. Pat. No. 3,641,603 also describes mechanical methods and apparatus for conforming the material to the mould.

The methods described may be useful both with natural and with synthetic upper materials e.g., leather, poromeric material or PVC.

Such upper materials conventionally have one side, which is known as the grain side, intended to form the outer surface of the upper and an opposite side, known as the flesh side, intended to form the inner surface of the upper. In the methods referred to, the flesh side of the material is presented to the surface of the mould.

The present invention has as one object the provision of a novel and improved method of preforming shoe uppers and shoe upper components.

Another object is the provision of an improved method of making preformed shoe uppers and shoe upper components having a characterized or patterned outer surface in the finished shoe.

According to one aspect of the present invention a method of making a shaped upper component for a shoe which comprises deformation of a flat sheet material to a shoe upper shape is characterized in that the sheet material is deformed by being conformed to a moulding surface having a preformed shape for said component, said preformed shape being such that said upper component is convertible from the preformed shape to a shoe upper shape essentially merely by bending, and is thereafter converted to the shoe upper shape essentially by bending and in that the sheet is held during the formation whereby the deformation involves stretching of the sheet material and in that the shaped upper component is turned inside out prior to assembly into the shoe.

Moulds having moulding surfaces of the preformed shape referred to above may be devised as disclosed in British Patent Specification Nos. 1102695 and 1102696 and in the specifications filed in the above mentioned applications, the disclosures of which are incorporated herein by reference. The preformed shape preferably includes the vamp and is such that in the region of the vamp point the distance between two points at the feather edge on opposite sides of the longitudinal axis of the preformed shape is not more than about 35 percent greater when measured along the surfaces of the preformed shape than when measured along a straight line between the two points, both measurements being along lines at right angles to the longitudinal axis of the preformed shape.

Preferably the first mentioned distance is about 10 percent greater than the second mentioned distance. However, the distance can be chosen according to the material with which the mould is to be used, the criterion being to avoid stretching of the material to such an extent that undesirable effects such as excessive thinning occurs.

One advantage which may be achieved by this aspect of the invention is that when the deformed material is turned inside out the outer layer of the material i.e. at the grain surface side is stretched and this may reduce the tendency to wrinkling in the subsequently assembled upper in the shoe.

In one form of this aspect of the invention the sheet material is conformed to a female mould and the surface of the sheet which will be inside the shoe is presented to the mould. This provides the advantage that where no embossing is required, the grain surface of the material remains unmarred by the forming operation.

It will be appreciated that a left hand preformed shape will produce a right hand shoe after the preformed shoe component has been turned inside out, and vice versa.

The term shoe upper component includes both a complete shoe upper and parts of a shoe upper, such as a vamp or forepart or a quarter or heel or back part, which will need assembly with other components to form the complete upper.

The invention can be used with material in the form of blanks which have been precut to the required shape, from the original sheet material, and with sheet material which is first moulded and thereafter at some stage, the upper which is preformed in the moulding step is cut from the sheet.

The deformation of the upper material to the preformed shape can be carried out by any suitable method for example pressure differential methods such as vacuum forming or pressure forming to a male or female mould or by mechanical methods e.g. by pressing a male mould into a clamped sheet of the material or any combination of these methods.

The use of super atmospheric pressures has a number of advantages especially in connection with male and female moulds and is preferred.

Such pressure may, if desired, be applied through a diaphragm or by a flexible bag, for example, or can be applied without these aids.

The air may be vacated from between the mould and the sheet by the application of a slight subatmospheric pressure to the mould side of the sheet or valves opening in response to rises in pressure may be provided to vent the air through the moulds. Such vents or valves can conveniently be located in the area which eventually will be cut out from the shaped material to provide the ankle opening in the shoe.

Where a synthetic upper material for example a thermoplastic material is used, it is preferably preheated before being conformed to the mould and the mould is preferably cold. Where leather is used, it is preferable that the mould itself be heated, and the leather is pretreated as by the application of heat and moisture, to make it soft.

It will be appreciated that in general the deforming pressure will be applied to the sheet material whilst it is either heated or wet with moisture or an extending agent and that the deforming pressure will be maintained whilst the material is cooled or dried.

The treatments are such that if the material was water vapor permeable before the deformation treatment it is still water vapor permeable after the deformation. Thus the preferred microporous unreinforced polyurethane sheets typically have collapse temperatures in the range 170° - 190°C i.e. when heated for say 10 minutes at these temperatures in a convection air heated oven they lose their porous structure and become translucent.

Clearly the heat treatments or liquid treatments are not such as to cause collapse of the material, i.e. the temperatures used are well below the melting temperatures of the polymers.

The preformed upper component is assembled to form a complete upper bent to the desired upper shape for example by wrapping round a last or shoe shape, being detached from the remainder of the sheet before this step and at least an out sole attached for example by injection moulding.

The preformed shape can be an accurate finished shoe upper shape apart from the bending or can be an oversize shape and could be allowed or caused to shrink to fit back onto a last or mould as by suitable heat treatment.

The reference to fluid pressure above includes it will be appreciated both gaseous or air pressure as well as fluid pressure applied by liquids.

If desired these fluids may be heated or heat may be separately applied for example by radiation or by dielectric heating.

The fluids may be inert to the extensible material or may be such as to enhance the materials extensibility for example moist air or steam could be used. Alternatively with homogeneous microporous thermoplastic sheet materials for example made of polyurethanes organic liquids such as acetone.

It was mentioned above that the conditions are such as to achieve at least temporary deformation whereby the material adopts a preformed shape which can be converted to a shoe upper shape essentially merely by bending. The permanency of the deformation need only be sufficient to achieve the object of the present invention namely that the deformed sheet can be converted to an actual shoe shape merely by being applied to and wrapped round a last or former or merely bent essentially requiring only a bending of the upper without the need for any significant further stretching of the material. Once the material is on a last and is held by the last in the shoe upper shape conventional setting techniques can be used to build in the strains or extensions introduced in the deformation step so that they are retained on a more permanent bases e.g. in temperate conditions for months, or even years. Desirably the initial deformation is such as to actually achieve a substantially permanent deformation in this sense with little or no setting being required on a last.

Such conventional setting techniques involve holding the material on the last for extended periods e.g. up to a month, dry heat treatment, e.g. exposures to dry air at 140°C on the last for a number of minutes, or moist heat treatment e.g. moist heated air or steam for similar or shorter periods.

An in situ reinforcing top line tape could be inserted in this part of the sheet material, prior to deformation. The moulds themselves may be made of porous rigid material to facilitate this e.g. being made of sintered high density polyethylene powder which material in one-eighth inch thickness can readily be moulded but which on cooling is a strong rigid material providing quite smooth surfaces.

A surface finish either plating to impart a smooth or patent finishing or embossing to provide a grained or other skin or patterned finish can be achieved simultaneously with the deformation step for example when using female moulds with the flesh surface of the material facing the mould. Thus if desired an embossing or plating means can be placed on top of the material so that embossing of the grain surface takes place during the forming operation. Such embossing means might be, for example, a diaphragm having an embossing surface or might be a flexible bag having an embossing surface, which bag might also be used for applying the pressure if pressure forming is carried out. Thus the use of embossing means can be especially advantageous as it will assist in the forcing of the material into the mould. Details of such means are given in the U.S. application Ser. No. 46,751, filed June 16, 1970.

Alternatively a suitably smooth or patterned or crumpled heat conducting sheet e.g. of metal foil e.g. 0.001 to 0.020 inches thick, such as aluminum foil can be used as taught in French Patent Specification No. 1598244 the disclosure of which is incorporated herein by reference. Relatively high short duration temperatures are preferred and these could be induced in the surface in contact with the coil either by conduction by providing resistance heaters in the moulds or by induction or dielectric heating especially if the surface of the sheet was wetted e.g. by wetting the foil prior to the process.

However, where the pattern is to be replicated a large number of times, it is preferred that the mould surface itself is provided with any desired aesthetic configuration such as to modify the surface appearance e.g. grain skin or emboss finishes or modifications, replicating cutting consolidating stitching, punching or inlaying techniques commonly used in shoe manufacture. Thus, the requirement for a separate embossing means is avoided.

Where the upper material has a grain surface and a flesh surface, as is normal in shoe upper materials, the surface on which the pattern is formed would normally be the grain surface.

Preferably the edges of the material around the mould are clamped during the forming operation, whether the material be in sheet form or in precut blank form. Peripheral clamping greatly assists in achieving a smooth unwrinkled moulding. The clamping can be conveniently achieved using a clamping member which co-operates with the surface of the mould which surrounds the edge of the mould cavity, the clamping member being shaped to correspond approximately with the outline or periphery of the moulding surface. Thus a female mould having a top surface which surrounds the moulding cavity and acts as one clamping member, simplifies clamping. The other clamping member may be, for example, made of steel strip.

Desirably the material is at least partially cut around the periphery of the preformed shape prior to removal from the mould thus avoiding the need for a subsequent cutting operation. The material is preferably held by clamping means which may also afford cutting means for at least preparing the preformed shape for severance from the sheet.

The said cutting means may comprise a heatable knife edge effective at clamping pressure only to cut the sheet material when heated and the cutting means are heated after the material has been conformed to the preformed shape, for a temperature and time such as to only partially sever the preformed shape from the sheet so that the preformed shape can be removed from the mould with the sheet and be subsequently torn from the sheet without itself being damaged.

Alternative arrangements resulting in clamping during the deforming step followed by partial and complete cutting can of course be used for example the knife edge could be blunt and increased pressure alone could be used for the cutting step.

The process can also be used to locate and even adhere additional shoe upper components on or in the deformed sheet during the deformation operation. Thus toe puffs counter stiffeners, doublers or others liners provided with heat or pressure activateable adhesives could be located in the desired position on the male or female moulds so that during the deformation process they are pressed against the surface of the sheet which will be the interior of the shoe upper. The adhesives are preferably chosen to be such that the heat or pressure or both effectively secure the components to the sheet material.

Control of the process may be facilitated by applying an initially quite high deforming pressure as for example in the nature of a pulse e.g. of at least multiples of 10's of p.s.i. even at least 10's or multiples of 10's of atmospheres for example as high as 500 p.s.i. or more followed by a lower pressure sustained for a longer period of time. This could economize on the use of pressure fluid thus providing production economics.

The invention also extends to apparatus for carrying out the methods of both the above aspects of the invention.

The present invention also extends to moulds for use in the methods and apparatus described above, especially male moulds having an inverted version of the desired characterization on their surfaces and female moulds having substantially smooth moulding surfaces.

The mould may be a female mould provided with a re-entrant portion or a male mould provided with a divergent turn in defining portion so that on turning the preformed shape inside out the turn in portion will face inwardly and after suitable notching or slitting, will readily wrap round the last with reduced wrinkling and avoiding the need for rubbing or ironing down onto the bottom of the last.

Use of adhesives to attach the outsole without the need for bottom tacking should also be facilitated because the turn in portion will have a reduced tendency to spread, for example during any heat setting step.

The invention may be put into practice in various ways and certain specific embodiments will be described by way of example and illustrated with reference to the accompanying drawings in which:

FIG. 3 is a plan view of the shell after it has been cut and removed from the last and flattened to a shape from which a mould is to be derived;

FIG. 4 is a perspective view of a mould according to the first aspect of the invention derived from the shell shown in FIG. 3;

Figure 15:
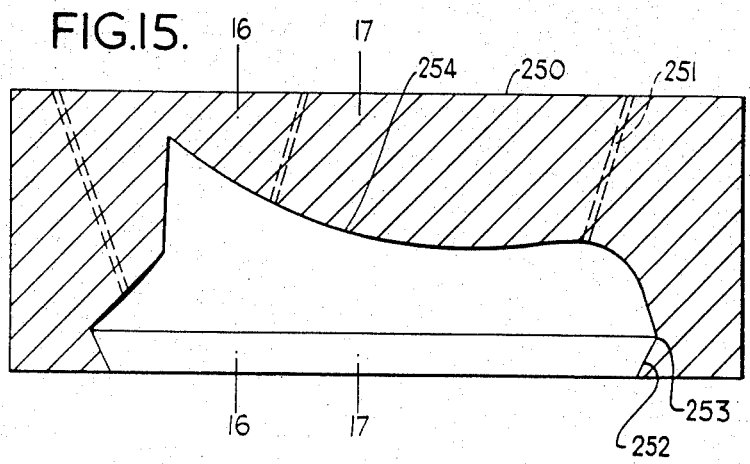
Figure 16:
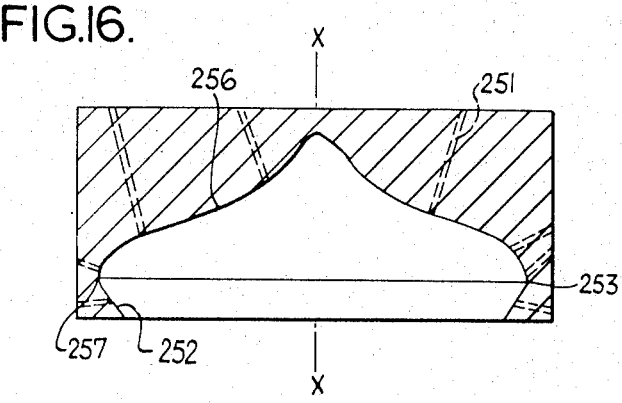
Figure 17:
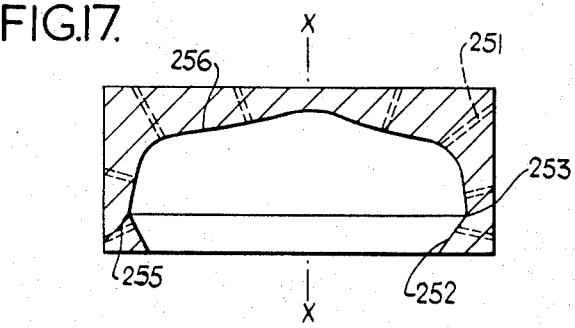
Figure 18:
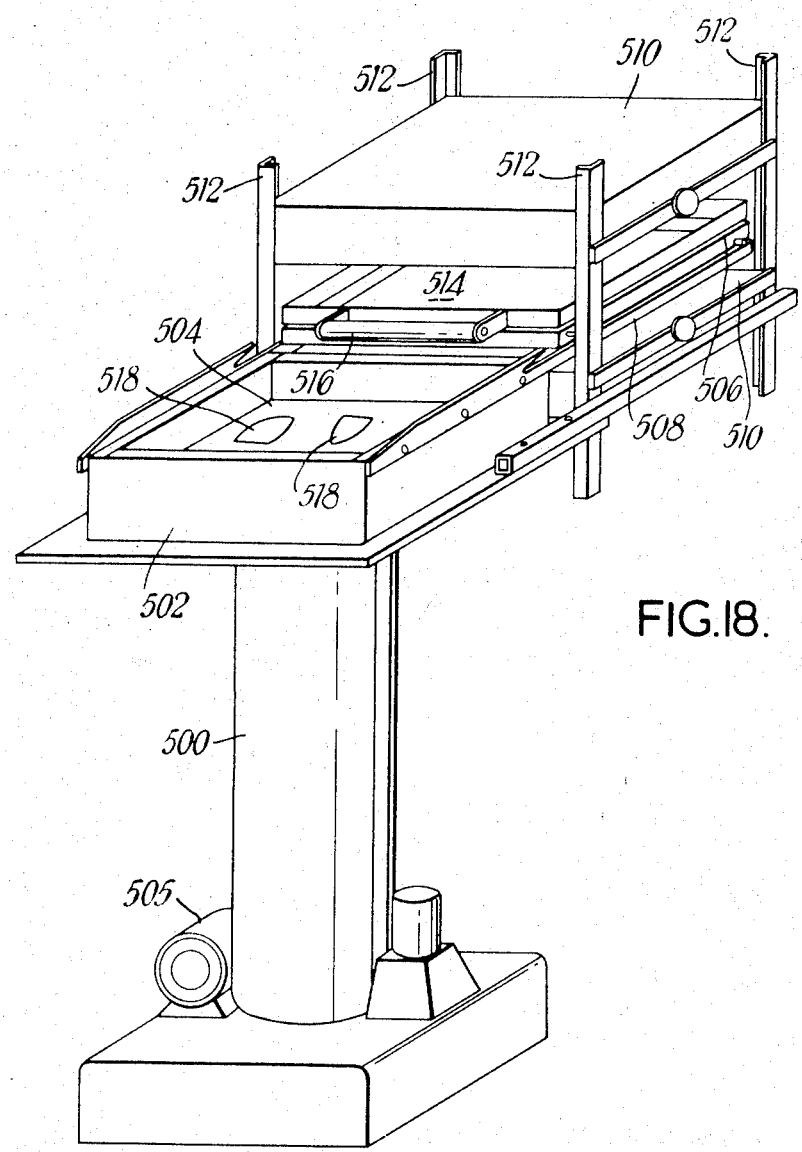
Figure 19:
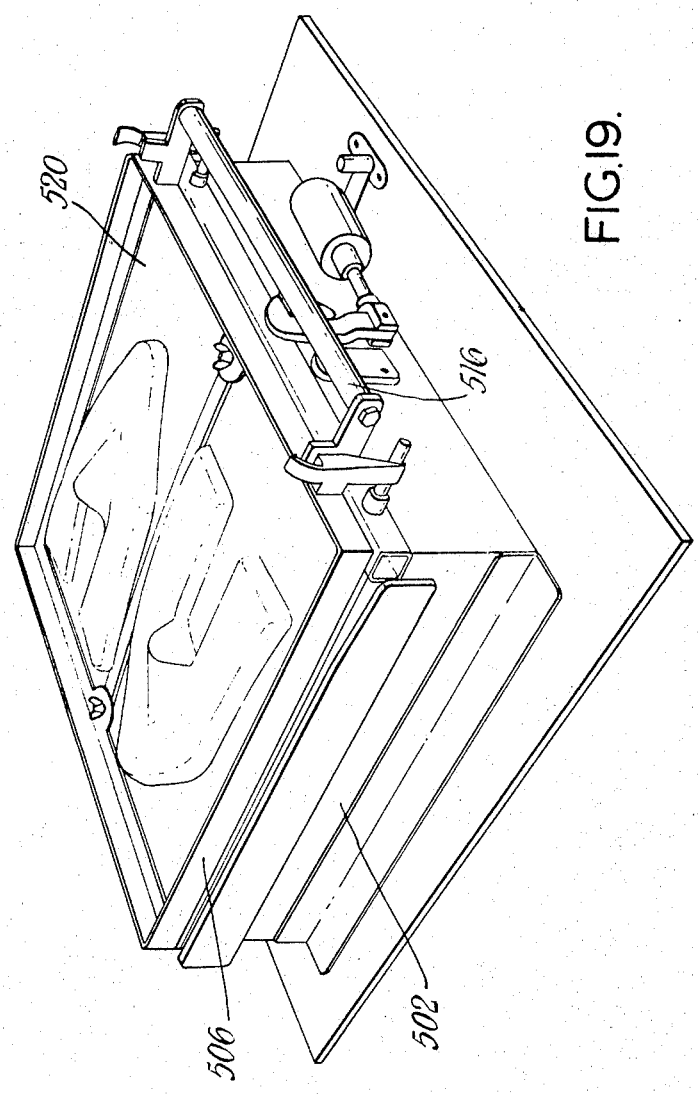

FIG. 15 is a longitudinal diagrammatic cross section of one form of a female mould having a characterized surface for making a shoe upper component, a vamp or forepart convertible to a shoe upper forepart shape merely by bending about the longitudinal axis X—X in the diagram. The mould 250 has vents 251 and a turn-in portion 252 giving accurate and automatic definition of the feather edge 253;

FIG. 16 is a diagrammatic cross section on the line 16 — 16 of FIG. 15;

FIG. 17 is a diagrammatic cross section on the line 17 — 17 of FIG. 15;

FIG. 18 is a perspective view of a vacuum forming machine for carrying out the method of the invention for example a synthetic upper material such as microporous polyurethane sheet material; and FIG. 19 is a detail of part of the machine of FIG. 18.

EXAMPLE 1

Female mould with smooth moulding surface

Figure 1:
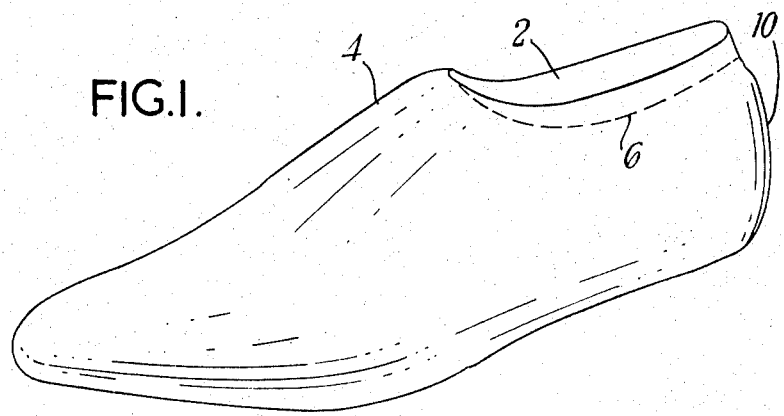
FIGS. 1 and 2 are respectively upper and lower perspective views of at last having a shell of resiliently deformable material conformed thereto, for use in deriving a female mould according to the first embodiment of the invention.
Figure 2:
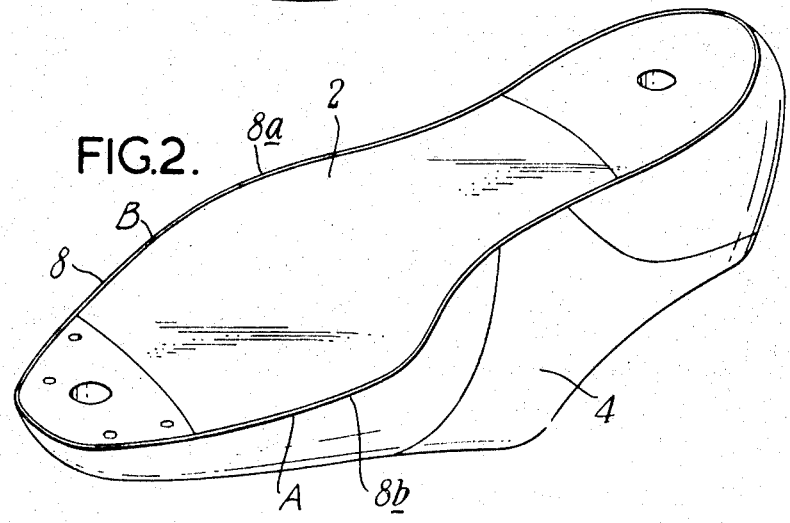
Figure 5:
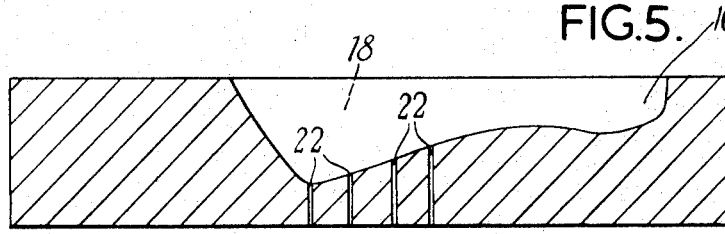
FIGS. 5, 6 and 7 and 8 are sections along the lines V—V, VI—VI, VII—VII, VIII—VIII respectively of FIG. 4.

Referring to FIG. 1, a last 2 has formed thereon a shell 4 of resiliently bendable material, such as an unplasticized polyvinyl chloride. The shell may be conformed to the last by a vacuum forming operation. The shell has been cut along the line 6 around the trim area of the last and the material removed from that area. Also, any shell material conforming to the sole part of the last has been cut away so that the edge 8 of the shell 4 corresponds precisely to the feather edge portion of the shoe which is to be formed. A vertical cut 10 is then made in the shell at the back of the heel and the shell is removed from the last.

The edges of the shell at the opposite side portions 8A, 8B are then moved outwardly so that the shell is flattened. This may conveniently by carried out by placing the shell on a board. The degree of flattening is preferably such that, to the rear of the toe area (namely in the region of the vamp point) the distance between points A and B on the feather edge, measured along the surface of the shell in a direction transverse to the longitudinal median line M—M is not more than 35 percent greater than the distance between the two points as measured in a straight line i.e. the direction distance between the points. Preferably the first distance is about 10 percent greater than the second. The flattening is also such that the edge 8 and the edges 10 (corresponding to the cut 10) lie in a single plane.

The mould is then derived from the inside surface of the shell in a conventional manner. During the formation of the mould a surface portion thereof corresponding to the lasting margin is added and is located in the vertical plane. The lasting margin surface portion of the mould is indicated at 12 in FIG. 4. Also, next to the edges 10 margin portions 14 are formed to enable the seaming of the preformed upper at the rear of the upper to be carried out.

Thus, it will be seen that the mould includes a surface area 16 defining the toe region, a surface area 18 deeper than the area 16 and disposed to the rear thereof and defining the vamp or cone portion of the upper and areas 20 defining respectively the side quarter portions of the upper.

Figure 6:
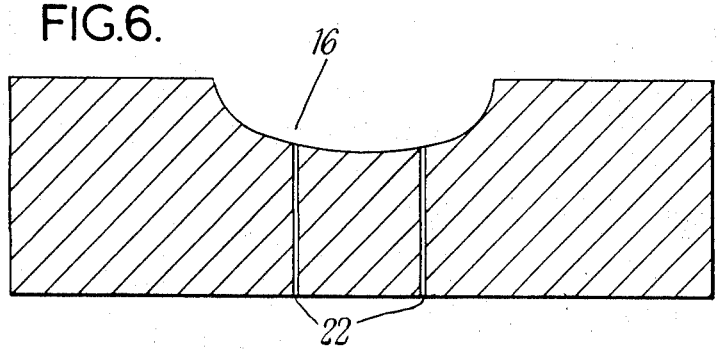
Figure 7:
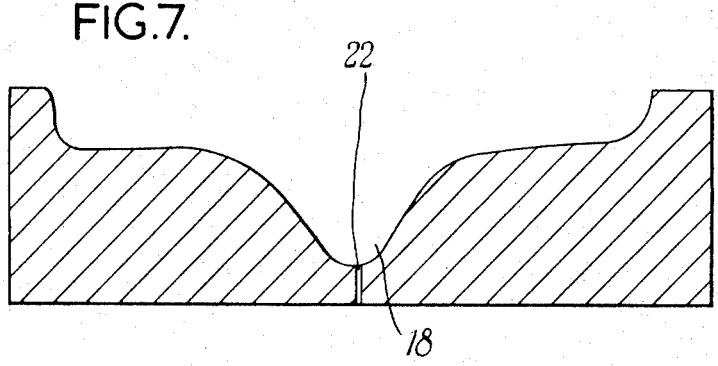
Figure 8:
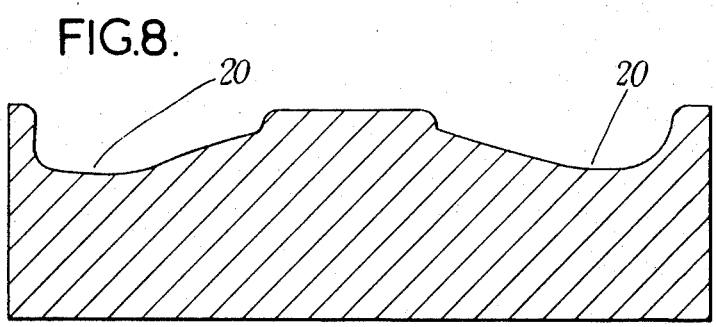

The mould has a plurality of bores 22 to enable a vacuum to be formed in the mould. In FIG. 6 the distance along the surface is about 25 percent greater than across the feather edge and in FIG. 7 about 30 percent.

EXAMPLE 2

The female mould described in Example 1 is used in the apparatus described below with reference to FIGS. 18 and 19 to mould a preformed shape from poromeric material preferably a homogeneous microporous polyurethane material as sold under the Registered Trade Mark PORVAIR (Details of the nature of this material are given in published Belgian Patent Specification No. 745132).

Wrinkling of the material as it is formed into the female mould is avoided as the edges of the material are clamped by clamps 506.

After the material has been deformed in the female mould it is removed from the mould and turned inside out. Before or after the turning inside out, the excess material around the edges is removed by any suitable cutting operation so that the edges of the upper now conform to the free edge of the lasting margin. Thus the preformed upper is formed.

It may be desirable after assembling the preformed upper with the remaining parts of the shoe on a last to carry out a post setting operation, as by heating in an oven.

EXAMPLE 3

Male mould with a characterized surface

Figure 9:
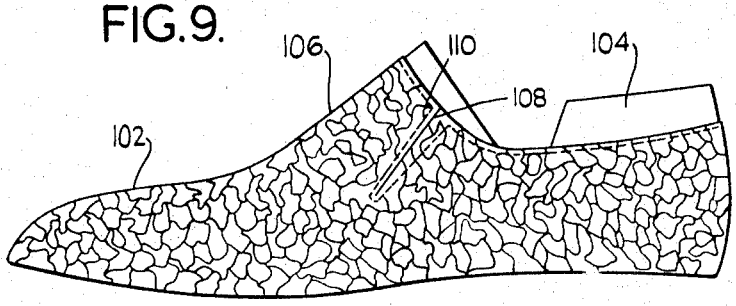
FIGS. 9 to 12 illustrate the steps involved in making a male mould having a characterized surface according to a second embodiment of the invention.

Referring to FIG. 9 a shoe upper 102 is located on a last 104. The upper 102 has a patterned outer or grain surface, and is of the gusset casual type, having at opposite sides of the vamp or cone portion 106 a vent or slit 108 behind which an elastic insert (not shown) is stitched along stitch line 110. The upper 102 is the model according to which shoe uppers are to be made utilizing the present embodiment of the invention. However as will become apparent, the pattern on the surface is an inversion of the pattern required in the shoes to be made.

Figure 10:
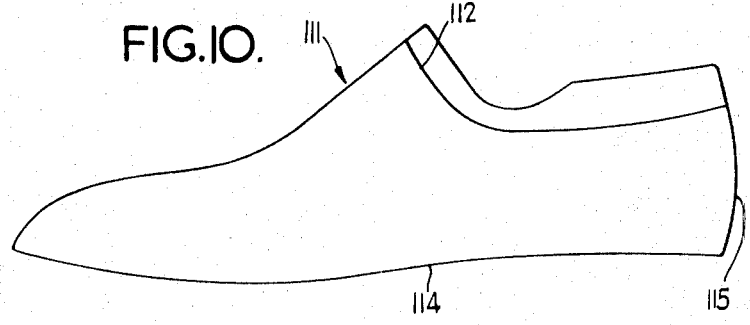

The first step in deriving the mould according to this embodiment of the invention is to vacuum from on to the last 104 with the model upper 102 assembled thereon a shell 111 (FIG. 10) of unplasticized polyvinyl chloride. The shell 111 is allowed to set, and thus becomes resiliently bendable. The shell 111 is then cut along the line 112 which corresponds to the top line of the upper 102 along the line 114 corresponding to the feather edge of the upper 102, and along a vertical line 115 at the back of the shoe.

Thereafter the shell 111 is removed from the last and is spread out, by moving outwardly the feather edge portions at opposite sides, and thus partially flattened. The spreading out and flattening is to such an extent that the lines 112, 114, 115 all line substantially in the same plane. The partially flattened shell 111 is attached to a board 116 as shown in FIG. 11 with its edges positioned in contact with the board 116 around the edge of an aperture 118 which is formed in the board 116 and is of the outline shape to which the shell 111 has been spread out.

Figure 11:
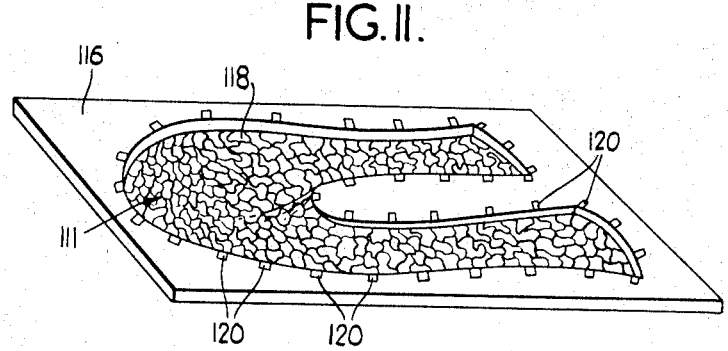

The attachment of the shell 111 to the board 116 can be conveniently achieved by small pieces of adhesive tape 120 which, as will be seen from FIG. 11 are disposed all the way around the aperture 118. As will be seen from FIG. 11 the inside surface of the shell 111 has formed on it a pattern which corresponds to the pattern on the outer surface of the model upper 102, although obviously the pattern on the shell is an inversion of that on the model upper 102, and hence corresponds precisely with the pattern required in the finished shoe.

Figure 12:
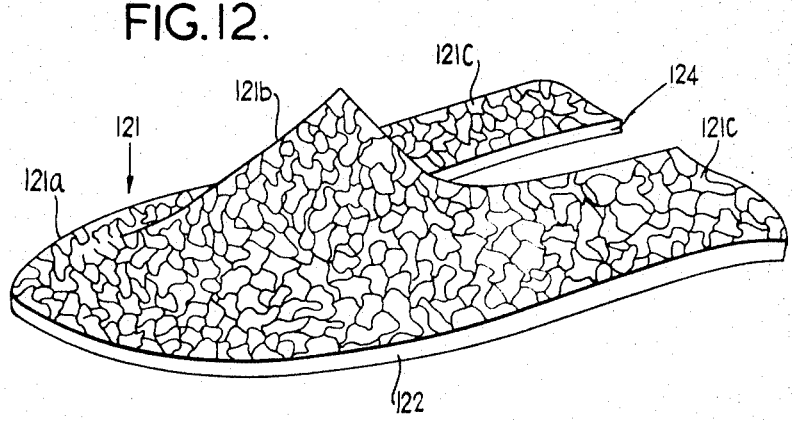

Next, a male mould, which is shown in FIG. 12 is derived from the inside surface of the shell 111 as spread out in FIG. 11. The moulding surface of this male mould bears a pattern which is an inversion of the pattern on the inside of the shell 111 and which is therefore the same as the original pattern on the model upper 102. The mould comprises a toe portion 121a, vamp or cone portion 121b and side quarter portions 121c. During the formation of the male mould a portion 122, defining a lasting margin, is added and a portion 124 around the top line is also added to define a margin for the top line.

EXAMPLE 4

The male mould described in Example 3 is used in the apparatus described below with reference to FIGS. 18 and 19 to mould a preformed shape convertible to a shoe upper shape essentially merely by bending and having a characterized surface.

A template 520 shown in FIG. 19 is used in this example and is placed over the sheet material during the formation and maintenance of the vacuum in the box 502.

The template 520 (FIG. 19) which is rectangular to fit within the clamp 506 and contains openings shaped to fit around the moulds 518 with the material thereon, is placed over these moulds as shown in FIG. 19. This template assists in ensuring that the material 514 is pulled down snugly over the moulds.

The use of the template is particularly advantageous where a number of uppers are to be formed simultaneously over moulds disposed in a closely spaced arrangement in the vacuum forming machine.

Next the moulds together with the template and sheet material are removed from the vacuum forming machine and transferred to a suitable support surface for cutting, by any convenient method, the preformed uppers from the sheet material 514. For example, the template can be used as a guide for a knife when cutting out the preformed uppers from the sheet 514; or if desired, a grinding operation can be used to sever the preformed uppers from the sheet material, the assembly of the template, moulds and material being inverted and passed under a grinding device.

The edges of the preformed upper now correspond precisely to free the edge of the margins of the required upper i.e. the lasting margin etc.

After the preformed uppers have been severed from the sheet material, they are turned inside out so that the grain surface which; is now patterned in view of its being conformed to the patterned moulding surface of the moulds 518, in accordance with an inversion of the pattern on the model upper 102 which is as desired.

It may be desirable after assembling the preformed upper with the remaining parts of the shoe on a last to carry out a post setting operation, as by heating in an oven.

EXAMPLE 5

Female mould with re-entrant turn in portion and characterized surface

Figure 13:
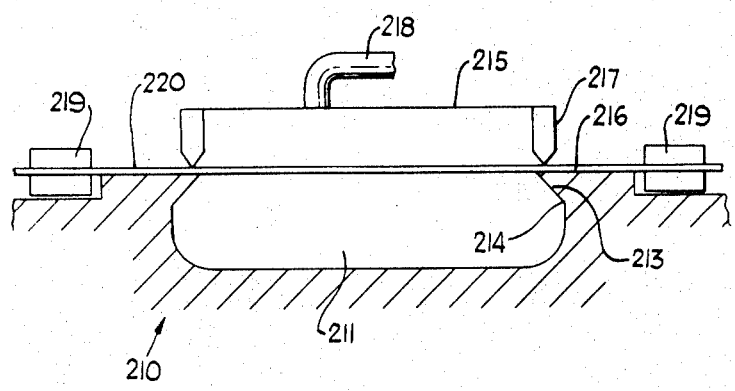
FIG. 13 is a diagrammatic cross sectional elevation of one form of apparatus suitable for putting the invention into practice using a female mould with a re-entrant turn in portion.

The apparatus shown in FIG. 13 comprises a block 210 defining a female mould 211 having re-entrant portions 213 at its edges and air vents about 1 mill (0.001 inch) in diameter. The re-entrant portions 213 provide a margin for turning in and attachment to an outsole and define a feather edge 214.

The block 210 is provided with a characterized or patterned surface. The characterized surface may be an integral part of the mould or may be provided by a silicone elastomer release lining or coating characterized or embossed to impart a surface pattern, e.g. a grain leather appearance, to the deformed sheet or decorating shoe features such as punching or stitching.

The apparatus also comprises a ram or pressure plate 215 movable into engagement with the top surface 216 of the mould 210. The edges of the ram are preferably arranged to provide a gripping or sealing contact with the top surface 216 and are also preferably provided by or with a knife edge 217 extending right round the edge of the female mould 211. This knife edge may be provided with heating means to facilitate separation of the deformed portion of the sheet from the remainder of the sheet. The plate 215 is also provided with pressure fluid inlet means 218 connected via suitable valves controllers and pressure gauges to a source of superatmospheric pressure fluid (not shown). Additional clamps 219 may be provided to hold the sheet in position during the deformation. The plaTe 215 may also be provided with heating means e.g. radiant or dielectric to enable the sheet to be heated to achieve the initial deformation into contact with the mould and to facilitate any setting step used to ensure substantially permanent deformation.

In an alternative embodiment (not shown) the top edge 216 of the block 10 provides the cutting edge and may either be provided with internal resistance heaters or the co-operating edge or area of the plate 215 may be provided with heating means.

One mode of operation is to preheat the sheet 20, e.g. a microporous polyurethane sheet 1.7 mm thick as described below to say 100° to 140°C locate it over the mould bring the pressure plate into sealing engagement, supply high pressure air e.g. at 100 p.s.i. for a few seconds then maintain the sheet in contact with the female mould for a further minute using air at a pressure of 15 to 20 p.s.i. whilst supplying radiant heat from the pressure plate at say 80° to 90°C. Pressure is then applied to the pressure plate and the knife edges 17 heated to say 170° to 180°C either to sever the material completely or enable the deformed area merely to be torn from the rest of the material.

The characterized surface of the mould may be made in a manner analogous to that described in Example 3.

Also the mould described in this example could be used in the apparatus described below with reference to FIGS. 18 and 19.

Other methods of arranging the relationship between the moulds and the superatmospheric pressure fluid can be used.

EXAMPLE 6

The sheets of extensible material may be laid one on top of the other and heated as described in Example 5 and then placed in a two part mould consisting of two female moulds, e.g. each as described for FIG. 13 placed opening to opening. Pressure fluid is then introduced between the two sheets to blow them apart and into the moulds. The pressure deforming and setting sequence and conditions for example being as for Example 5. One of the moulds could be provided with a heated knife edge as for FIG. 13 interrupted at one or more places to allow passage of a pipe for introducing the pressure fluid between the sheets.

EXAMPLE 7

In a further alternative embodiment the pressure plate 215 in FIG. 13 could be provided with an inflatable enclosure, preferably shaped to conform to the female mould 211. This economizes on the supply of pressure fluid.

EXAMPLE 8

As a further alternative the inflatable enclosure could be replaced by a perforated or porous plug conforming essentially to the shape of the female mould although leaving a significant space there between for access of the pressure fluid.

EXAMPLE 9

Female mould with characterized surface

Figure 14:
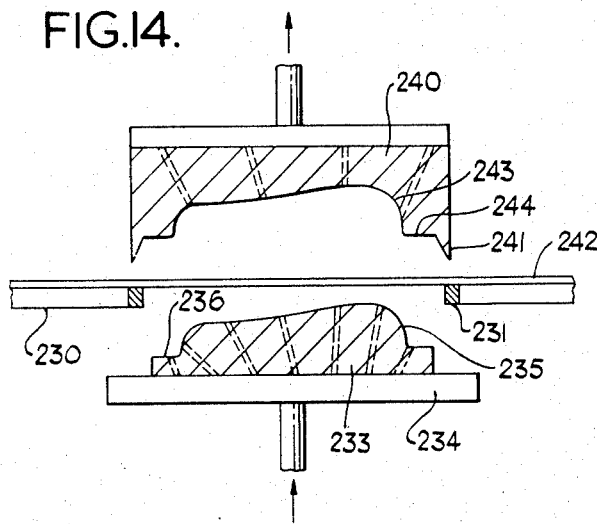
FIG. 14 is a diagrammatic cross sectional elevation showing a male mould movable up through a template and co-operating with a characterized female mould carried in clamping and cutting means.

Referring to FIG. 14 the apparatus comprises a template 230 having a hole 231 corresponding generally to the plan area of the shoe upper after deforming. On one side of the template 230 there is mounted a perforated plug 233 provided with a plenum chamber 234 fed as was the input 218 in FIG. 13 with superatmospheric pressure fluid. This plug has a shoe upper contacting surface 235 and a turn in contacting surface 236. On the other side of the template 230 there is mounted a perforated vented female mould 240 provided with a cutting edge 241 and pressure applying means as in conventional clicker presses. The cutting edge is located just outwardly of the edge of the hole 231 in the template 230 so that sheet material 242 can be cut between the edge 241 and the template 230. The mould 240 has a characterized shoe upper defining surface 243 and a turn in defining surface 244. The surface is characterized in the same way as described in Example 5. The plug 233 and the mould 240 are of such dimensions that the plug can pass through the aperture 231 and the surfaces 236 and 244 come into sealing and gripping engagement spaced only by the sheet 242 whilst an adequate space to provide access for the pressure fluid to evenly deform the sheet 242 is still left between the surfaces 235 and 243.

The sequence of operations is analogous to that described in Example 5.

EXAMPLE 10

Female mould forepart with turn in portion

FIGS. 15 to 17 show a female mould forepart with a re-entrant turn in portion 252 defining the feather edge 253. FIG. 17 is a section through the region of the vamp point 254 and the length of the direct line between point 253 and 255 is 5.9 units whilst the length measured around the surface 256 is 7.9 units i.e. the length along the surface is about 35 percent greater than that along the straight line.

In FIG. 16 the length between point 253 and 257 is 7.5 units whilst that around the surface 256 is 9.0 units i.e. the length along the surface is about 20 percent greater than that along the straight line.

The surface 256 may be characterized as describe in Example 5.

Vacuum or pressure forming apparatus

A preferred form of vacuum or pressure forming apparatus is shown in FIGS. 18 and 19. The vacuum forming machine comprises a container 500 on top of which is mounted a vacuum box 502 which contains a vertically reciprocable air permeable support member 504. The support member 504 can be reciprocated by a mechanism (not shown) located within the container 500 e.g. an air pressure or fluid pressure actuator. A vacuum pump 505 is connected to the container 500 to evacuate air therefrom as well as from the vacuum box 502.

A rectangular clamp 506 is horizontally reciprocable on rails 508 between a position between radiant heaters 510 which are supported, to one side of the vacuum box 502, on legs 512, and a position in register with the vacuum box 502. The clamp is for supporting a piece of shoe upper material 514 during the steps of heating the material and conforming it to moulds as hereinbefore described. The reciprocation of the clamp 506 is carried out manually, for which purpose a handle 516 is attached to the clamp. Latching means (not shown) is provided for securing the clamp 506 in air-tight relationship with the vacuum box 502 when the clamp is in register with the vacuum box, whereby vacuum can be developed within the vacuum box. The vacuum box contains two moulds 518 which may be as described with reference to any of the Examples 1, 3, 5 and 10 as illustrated in FIG. 4.

In operation the vacuum pump 505 is operated to develop vacuum in the container 500, from which communication into the vacuum box 502 is normally interrupted by a suitable valve arrangement. The heaters 510 are energized. A piece of poromeric material from which the uppers are to be made is fixed in the clamp 506 with its grain surface lower most and the clamp located between heaters 510 so that the material 514 is heated and softened preparatory to the forming operation. Thereafter the clamp 506 is moved to its position in register with the vacuum box 502 and secured in that position by the aforesaid latching means. The mechanism for reciprocating the support 504 is then operated to raise the support and force the moulds 518 into the material 514. At the same time, the aforesaid valve is opened to place the vacuum box in communication with the container 500 whereby a vacuum is formed in the box 502.

The extensible material is preferably at least 0.5 mm thick. For use in the production of footwear the material preferably has a thickness in the range 0.5 mm to 5 mm and for womens weight shoes in the range 0.8 to 1.5 mm preferably 0.8 to 1.1 mm. For men's weight shoes the range is preferably 1.1 to 2.5 mm especially 1.5 to 1.8 mm.

The material is extensible preferably having an elongation at break of at least 20 percent. The use of superatmospheric pressures in accordance with the present invention enables materials of such low extensibility to be conformed from sheet material to three dimensional configurations. The use of vacuum techniques would either be ineffective to achieve the required deformation or would require the use of high forming and setting temperatures which would be liable to have adverse effects on the water vapor permeable material, for example causing damage to the surface of the material, degradation of the polymer or initiation thereof, or loss of preformed surface characterization such as embossing.

Thus the extensible material may include fibrous reinforcement for example in the form of a woven, knitted or non-woven sheet adhered to or embedded in the water vapor permeable thermoplastic material, or in the form of a non-woven felt desirably consolidated as by punching with barbed needles and impregnated with water vapor permeable thermoplastic polymer. Such materials may be provided with adhered woven fabric reinforcements or elongated cell sponge or honeycomb-like masking layers or microporous wear resistant surface layers or any combination of these four possibilities.

Materials of this type are disclosed in British Patent Specification Nos. 914711, 914713 and 1002225, the disclosures of which are incorporated herein by reference.

However, as mentioned above, the preferred material is one which does not have its extensibility constrained by the pressure of fibrous reinforcement. Especially suitable materials have extensibilities i.e. elongations at break which are in excess of 100 to 150 percent and particularly are at least multiples of hundreds of per cent e.g. 300 to 500 percent or even 700 percent through materials with values in the range 250 to 450 percent or 350 to 400 percent are of particular suitability.

These materials to make them useful for shoe uppers purposes also desirably have ultimate tensile strengths of at least 20 lbs/inch width/mm thickness and preferably 25 lbs/inch width and preferably at least multiples of tens of lbs/inch width/mm thickness.

The materials are preferably water vapor permeable at least to the extent of having a water vapor permeability of at least 100 preferably at least 500 e.g. 900 – 1,500 or even 2,000 g/m²/24 hrs.

The preferred microporous polyurethane sheet preferably has an apparent density in the range of about 0.25 to 0.7 grams/cm³, more preferably in the range of about 0.35 to 0.5 grams/cm³. Typically the density of the polyurethane itself is about 1.2: it will therefore be apparent that in the neighborhood of one-fourth to one-half of the volume of the microporous material is air. The sheet preferably has a percent elongation at break of above 50 percent (e.g. in the range of about 300 to 400 percent or more): a tensile strength above 35 Kg/cm² (e.g. in the range of about 60 to 100); an elastic modulus above 2 Kg/cm² (e.g. in the range of about j4 to 9) and a notch tear strength above 2 (e.g. in the range of 3 to 5) Kg per mm of thickness. It should permit the passage of water vapor; thus its water vapor transmission should be at least 200 g/m²/24 hrs (measured as in ASTM E 96-66, procedure B). Also, it is desirable that at least the upper surface of the sheet, after suitable finishing, be resistant to the passage of liquid water, e.g. the finished sheet should have a hydrostatic head (British Standard 2823) of above 100 mm Hg. While the polyurethane itself usually shows a tension set below 100 percent as previously discussed, the preferred microporous polyurethane sheets generally recover completely with substantially no permanent set (under standard dry conditions at room temperature) after being stretched 100 percent.

All measurements referred to herein are made at room temperature (e.g. 23°C) unless the test method specifies otherwise.

It has been assumed in describing the examples above that the material is a poromeric e.g. a microporous thermoplastic polyurethane. However, the process is equally applicable to other synthetic upper materials which may be porous or not such as PVC. The process can also be applied to forming leather uppers. In this case, the leather would normally be covered by a sheet of impermeable material, preferably rubber which would assist in the forming of the vacuum, leather being usually relatively porous. With some leathers it may be desirable to use a pressure forming operation, or a combination; of high pressure on one side of the leather with vacuum on the other. Also where forming leather uppers it is desirable to precondition the leather usually by heat and moisture and to utilize heated moulds for the heating of the material so that the heating takes place simultaneously with the forming operation.

Further the carrying out of the present invention utilizing pressure forming instead of vacuum forming can be understood by reference to the U.S. application Ser. No. 86,116, filed Nov. 2, 1970.

It will be appreciated that the degree to which the shell 11 is flattened by spreading out the feather edge portions at opposite sides, in deriving the male mould, is chosen to suit the particular upper material, which is to be used with the mould that is being formed. The criterion is that the depth of the mould should not be so great as to cause excessive thinning of the upper material during the moulding operation.

Various modifications are possible within the scope of the invention.

Thus, although the invention has been described particularly in connection with the formation of shoe uppers utilizing sheet material during the conforming of the material to the moulds, it would equally be possible to pre-cut the sheet material into blanks before the conforming operation is carried out, for example as described in the aforesaid Patent Nos. 1102695 and 1102696. And the invention is applicable to forming just the forepart or just the backpart of the upper, as well as to forming the whole upper.

Further, although the apparatus shown in FIG. 19 heats the material from both sides, it may be found advantageous in some cases to heat from only one side. Likewise, other forms of heating such as HF heating instead of radiant heating could be used.

It has been mentioned above that the use of superatmospheric pressures is preferred. The maximum theoretical pressure difference which can be exerted in vacuum techniques is 14 p.s.i. whilst the practically attainable pressure difference may be significantly lower especially when porous materials are involved. In addition certain problems may be encountered with vacuum techniques in achieving even evacuation over the whole deformed area. In particular, expensive porous moulds or complicated evacuating means may have to be used. When porous moulds are used these may impart an undesired modification to the surface of the material. In addition the lower available pressure differences may force one to use high temperatures at which a material having a pre-characterized or embossed surface will either lose this embossing by reason of the plastic memory of the softened material or will have the pre-characterization flattened out possibly permanently.

The use of superatmospheric pressures enables lower temperatures to be used in the initial forming stage and moreover enables the actual pressure difference used to be adjusted to suit the requirements of the extensible material being deformed in a way which is not significantly possible with vacuum techniques. In addition since the fluid pressure is positively applied on the side away from any mould used a very even distribution of pressure over the whole area being deformed can be achieved.

We claim:

1. A method of making a shaped upper component for a shoe which comprises deforming an initially flat sheet material by conforming to a moulding surface having a preformed shape for said component, said preformed shape being substantially the same as that which would be arrived at by making a shell of resiliently flexible material in the shape of the last corresponding to the desired upper and partially flattening out said shell by outwardly displacing opposite side portions thereof, said preformed shape being such that said upper component is convertible from the preformed shape to a shoe upper shape by turning the component inside out and then essentially merely bending the component, the sheet being held during the deformation whereby the deformation involves stretching of the sheet material; and converting the deformed material to the shoe upper shape essentially by turning the shaped upper component inside out and then essentially merely bending the component prior to assembly into the shoe.

2. A method of making a shaped upper component for a shoe as claimed in claim 1, which comprises applying a fluid pressure difference across a sheet of extensible upper material, the pressure on at least one side of the sheet being in excess of atmospheric pressure, whereby at least certain areas of the sheet undergo at least temporary deformation such that said deformed sheet on the pressure being removed possesses the preformed shape.

3. A method as claimed in claim 2, wherein the pressure difference is applied by applying an initially quite high deforming pressure followed by a lower pressure sustained for a longer period of time.

4. A method as claimed in claim 3, wherein the initial pressure is in the nature of a pulse of at least multiples of 10's of p.s.i.

5. A method as claimed in claim 1, wherein the preformed shape includes the vamp and is such that in the region of the vamp point the distance between two points at the feather edge on opposite sides of the longitudinal axis of the preformed shape is not more than about 35 percent greater when measured along the surface of the preformed shape than when measured along a straight line between the two points, both measurements being along lines at right angles to the longitudinal axis of the preformed shape.

6. A method as claimed in claim 1, wherein the sheet material is conformed to the surface of a male mould which itself is characterized such as to impart at least a surface finish to the said surface of the upper material.

7. A method as claimed in claim 6, wherein the characterization of the surface of the mould is such as to impart a decoration to that surface of the upper material which is to be the outer surface of the upper.

8. A method as claimed in claim 1, wherein the sheet material is conformed to a female mould and the surface of the sheet which will be inside the shoe is presented to the mould.

9. A method as claimed in claim 1, wherein the sheet is conformed to a mould provided at its edges with a divergent portion such as to define a turn in portion and feather edge for the eventual shaped upper component, whereby on turning the preformed shape inside out a re-entrant turn in portion is provided.

10. A method as claimed in claim 1, wherein the surface of the mould is afforded by a release lining.

11. A method as claimed in claim 1, which comprises at least partially cutting the material around the periphery of the preformed shape prior to removal from the mould.

12. A method as claimed in claim 1, wherein the material is held by clamping means which also afford cutting means for at least preparing the preformed shape for severance from the sheet.

13. A method as claimed in claim 12, wherein the cutting means comprise a heatable knife edge effective at clamping pressure only to cut the sheet material when heated and the cutting means are heated after the material has been conformed to the preformed shape, for a temperature and time such as to only partially sever the preformed shape from the sheet so that the preformed shape can be removed from the mould with the sheet and be subsequently torn from the sheet without itself being damaged.

14. A method of making a shaped upper component for a shoe which comprises deformation of an initially flat sheet of material to a moulding surface having a preformed shape for said component, said preformed shape being substantially the same as that which would be arrived at by making a shell of resiliently flexible material in the shape of the last corresponding to the desired upper and partially flattening out said shell by outwardly displacing opposite side portions thereof, said preformed shape being such that said upper component is convertible from the preformed shape to a shoe upper shape essentially merely by bending, the sheet being held during the deformation whereby the deformation involves stretching of the sheet material, the deformation being carried out with that surface of the sheet material which is to be the outer surface of the upper presented to said moulding surface and said moulding surface being itself characterized such as to impart at least a surface finish to the said surface of the upper material; and thereafter converting the upper component from the preformed shape to the shoe upper shape essentially by bending.

15. A method as claimed in claim 14, in which shoe components provided with heat or pressure activateable adhesives are located in the desired position on a surface of the sheet so that during the deformation process they are pressed against the respective surfaces of the sheet the adhesive being chosen to be such as to effectively secure the components to the sheet material during the deforming operation.

16. A method as claimed in claim 14, wherein the mould is provided at its edges with a re-entrant portion such as to define a turn in portion and feather edge for the eventual shaped upper component.

17. A method according to claim 1, wherein said moulding surface is a male moulding surface and wherein the deforming is carried out with that surface of the sheet which is to be the outside surface of the upper presented to said moulding surface.

18 A method according to claim 1, wherein said moulding surface is female, said deforming being carried out with that surface of said sheet which is to be the inside surface of the upper presented towards said moulding surface.

* * * * *